United States Patent [19]
Stohr

[11] 3,848,314
[45] Nov. 19, 1974

[54] ASSEMBLY OF SUBSTANTIALLY PARALLEL METALLIC SURFACES

[75] Inventor: Jacques Andre Stohr, Nice, France

[73] Assignee: Commissariat A L'Energie Atomique, Paris, France

[22] Filed: Oct. 24, 1972

[21] Appl. No.: 300,242

[30] Foreign Application Priority Data
Nov. 4, 1971 France .............................. 71.39512

[52] U.S. Cl. ................................................ 29/191
[51] Int. Cl. ............................................. B23k 15/00
[58] Field of Search ..... 29/472.1, 191; 219/121 EM

[56] References Cited
UNITED STATES PATENTS

| | | | |
|---|---|---|---|
| 2,829,238 | 4/1958 | Hackman............................ | 219/127 |
| 3,185,815 | 5/1965 | Anderson................. | 219/121 EM X |
| 3,458,683 | 7/1969 | Canonico et al.............. | 219/121 EB |
| 3,486,218 | 12/1968 | Buyze .......................... | 219/121 EM |

FOREIGN PATENTS OR APPLICATIONS

| | | | |
|---|---|---|---|
| 908,726 | 10/1962 | Great Britain................ | 219/121 EB |
| 1,228,896 | 4/1971 | Great Britain................ | 219/121 EB |

Primary Examiner—Winston A. Douglas
Assistant Examiner—O. F. Crutchfield
Attorney, Agent, or Firm—Cameron, Kerkam, Sutton, Stowell & Stowell

[57] ABSTRACT

Parallel plates having a very small relative spacing and assembled in a stack so as to constitute a heat-insulating structure are joined together in pairs by means of connecting bridges formed by electronic beam welding.

The bridges are formed from the exterior of the assembled plates by controlled collapse in the beam impact zone so as to produce metallurgical bonds across the spaces provided between the plates. Said bridges extend along lines defining closed compartments between the plates and a vacuum is maintained therein for the welding process.

4 Claims, 4 Drawing Figures

PATENTED NOV 19 1974 3,848,314

ASSEMBLY OF SUBSTANTIALLY PARALLEL METALLIC SURFACES

This invention relates to a method of carrying out by application of electron bombardment techniques the assembly of two substantially parallel metallic surfaces separated by a space of small thickness. The invention is also directed to the preparation structures means of said method of sturctures formed by the superposition of parallel sheet metal elements of relatively small thickness. Structures of this type can be employed in the manufacture of containers, pipes, laminated walls and the like, in which the metallurgical bonds between the sheet metal members are particularly remarkable both from the point of view of their mechanical properties and from the point of view of resistance to external agents such as temperature, corrosive liquids and so forth. Even more precisely, the invention relates to a preferential but not exclusive application of said method to the construction of structures which provide heat insulation for the walls of a nuclear reactor, said structures being intended especially to serve as thermal barriers between a high-temperature heat-transporting fluid which is in contact with the reactor core and an outer containment vessel which surrounds the entire installation.

It is known that the practical achievement of heat insulation of the walls of a nuclear reactor presents a difficult problem by reason of the particular operating conditions in these installations in which the materials employed are exposed to high radiation levels and subjected to the direct action of a heat-transporting fluid. Furthermore, in order to solve the problem, it is necessary to take into account the potential danger of accidental damage of the insulating structure employed and the sometimes serious consequences which can affect the outer containment structure and auxiliary equipment.

Moreover, it is known that structures of this type are more effective or in other words afford higher resistance to the transmission of heat through these latter as the thermal conductivity of materials constituting such structures is lower and as the quantities of heat transferred by parasitic convection and radiation are smaller. To this end, it has already been proposed to form heat-insulating structures which comprise at least two metallic walls separated by a sheet of gas, a wide range of different types of gas being open to selection especially as a function of its behavior under irradiation. In point of fact, provided that the transfer of heat by convection remains negligible, some gases are excellent insulators even when the particular characteristics of the reactor under consideration lead to the use of said gases under relatively high pressures.

However, by reason of the rapid increase in leakage arising from convection when the sheet of gas is of greater thickness in respect of given values of pressure and temperature, it is usually necessary to distribute this thickness between a number of superposed sheets and this entails the need to increase the number of leak-tight separation surfaces. In practice, the assembly of sheet metal elements which have a small relative spacing necessarily involves the formation of a large number of thermal bridges for the interconnection of said elements. The resultant disadvantage is aggravated by the fact that the conductivity of the materials which constitute these connections is very high in comparison with the conductivity of a gas and that the contacts between the sheet metal elements which result especially from the welding or brazing agents employed are usually excellent from a thermal standpoint.

In order to overcome these disadvantages, it has already been proposed to form insulating structures which are applicable in particular to the protection of the walls of a nuclear reactor vessel by dividing into compartments the volume which is limited by two adjacent and parallel sheet metal elements, the compartments being formed by leak-tight partitions which define a sufficiently closely-spaced network by means of a suitable layout. Thus any accidental and localized rupture of the structure results only in damage to one or a small number of compartments without impairing the leak-tightness of the others, thereby reducing parasitic heat transfer processes to a corresponding extent. However, by creating partition-walls, this solution considerably increases the number and surface area of contacts between the sheet metal elements of the structure. This has the general effect of reducing the efficiency of the insulation and entails the need for compensation by increasing the number of sheets of gas. Furthermore, in the known structural designs, the connection between any two sheet metal elements in accordance with the compartment pattern adopted is usually obtained by brazing with filler metal or by resistance welding, which calls for accessibility of the external faces of the sheet metal elements to be joined together and does not make it possible to form a one-piece multi-lamination structure comprising a high number of successive sheet metal elements.

The present invention is intended to overcome these disadvantages by means of a method of assembly of parallel metallic surfaces, which permits in particular the fabrication of heat-insulating structures having particular advantages over similar structures of the prior art.

To this end, the method under consideration essentially consists in making use of an electron beam to produce at the exterior of said surfaces and without any metallic intermediary within the space formed therebetween a controlled collapse of the zone of impact of said beam on said surfaces, thereby creating across said space a metallurgical bonding bridge between said surfaces.

As a result of a suitable choice on the one hand of the welding parameters, especially the power of the electron beam, the rate of displacement and focusing of said beam and, on the other hand, of the thicknesses of the surfaces to be assembled which are usually constituted by sheet metal elements as well as the thickness of the space provided between said elements, there is formed in accordance with the invention a continuous connecting bridge having metallurgical characteristics which are very substantially similar to those of a weld fillet of comparable penetration. Said connecting bridge is formed by electron bombardment on the two sheet metal elements placed against each other or alternatively on a single sheet metal element having a thickness comprised between the sum of thicknesses of the two sheet metal elements and said sum increased by the distance between these latter; in the case of a given material, this distance is related to the value of the thickness of the sheet metal elements themselves.

As has already been stated, the method which is contemplated can be employed in a large number of industrial applications and in particular for the fabrication of a heat-insulating structure comprising a stack of substantially parallel metallic plates having a small relative spacing. Said structure is distinguished by the fact that the plates are joined together in pairs by means of connecting bridges formed by beam welding of said plates, said bridges being such as to extend along lines which define closed compartments between the plates, the degree of vacuum which is necessary for the welding operations being maintained within said compartments.

By means of the method according to the invention, it is thus possible to form connecting bridges from the exterior of the plates as a result of controlled collapse of the zone which is subjected to the impact of the electron beam. As the beam progresses, so the connecting bridges form a strictly leak-tight partition system between said plates. The surface area of each compartment thus formed is chosen as a function of the practical conditions of use of the fabricated structure and especially of the limits permitted by the creation of a hot spot resulting from an accidental rupture of a plate which has been exposed to the source of heat and in particular to the heat-transporting fluid in the case of a structure employed to protect the wall of a nuclear reactor vessel.

The replacement of the stagnant sheets of gas which were known in the prior art by an atmosphere at very low pressure which is of the order of $10^{-2}$ torr under the least favorable conditions but which can attain $10^{-4}$ or less constitutes a first outstanding advantage of the structure under consideration whilst the presence of a relative vacuum in fact removes any convection of heat between parallel plates. Moreover, the formation of bridges corresponding to weld fillets of small section and small width minimizes the magnitude and influence of thermal bridges or leakage paths created between said plates inasmuch as the connecting bridges can advantageously be relatively displaced from one plate to the other in such manner that the partition-line pattern formed between any given plate in the structure and the preceding plate should be displaced with respect to the partition-line pattern formed between said given plate an the following plate. In consequence, the lines of thermal leakage through the plates and the connecting bridges necessarily follow paths having a length which is considerably increased with respect to those which would be offered if the partition-line pattern were formed in all the plates in the same position, which would be the case if the connecting bridges were located exactly opposite each other.

When the compartment network has a substantial pitch and large dimensions of compartments either in length or in width compared with the thickness of the space between them, the production of a high relative vacuum between the plates of the structure is liable to give rise in particular to a crushing force which acts on said compartments and modifies the parallel relation of the plates while introducing parasitic stresses in the connecting bridges. In order to overcome this disadvantage, the structure is advantageously provided with spacer members mounted within the space formed between two adjacent plates; said spacer members can be constituted in particular by wires arranged in a uniform trellis in contact with the walls of oppositely-facing plates, said wires being passed through the connecting bridges between said plates without interrupting the leak-tightness of the compartments formed.

Further properties and advantages of the method and structures in accordance with the invention will become apparent from the following description of a number of exemplified embodiments which are given by way of indication without any limitation being implied, reference being made to the accompanying drawings, wherein.

Figure 1:
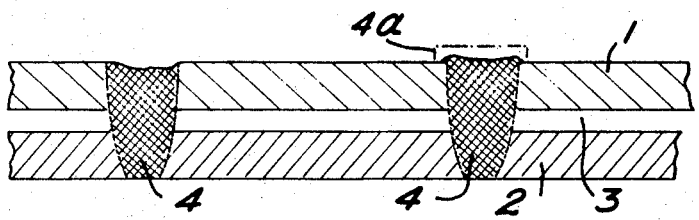
FIG. 1 is a highly enlarged sectional view of connecting bridges formed between two substantially parallel metallic plates separated by a space having a given thickness.

In FIG. 1, the reference numerals 1 an 2 designate two parallel metallic plates separated by a space 3 of smaller thickness. In this figure, said plates and the separating space are shown with a magnification of approximately ten times; in practice, each plate has a thickness of the order of 1 mm and the space 3 has a height of approximately 2/10 mm.

In accordance with the invention, the connection between the plates 1 and 2 across the space 3 is formed by means of bridges as designated by the reference numeral 4, each bridge being formed by the impact of an electron beam having suitable power and focusing. Each bridge 4 of small cross-sectional area and relatively small width is obtained directly from the exterior of the plates by collapse and melting of the metal of said plates under the impact of the electron beam and in particular without any metallic intermediary within the space 3. Should the need arise, although this is not in any way essential, a metallic strip 4a can be placed in position on top of the plate 1 to which the beam is applied. Said strip is formed of the same material as the plate and makes it possible to endow the upper portion of the bridge 4 which is formed with a substantially flat shape without any appreciable discontinuity of the surface of the plate 1.

The formation of a plurality of parallel connecting bridges 4 extending through said plates in much the same manner as continuous weld fillets thus makes it possible to form between the plates 1 and 2 and across the space 3 a uniform partition system forming compartments and dividing said space into adjacent zones which are leak-tight with respect to each other and in which is maintained the vacuum required for the welding operations proper. This arrangement therefore makes it possible to form heat-insulating structures in spite of the good metallurgical quality of the connecting bridges 4 which introduce a not-negligible thermal contact between the two plates, said contact being repeated a greater number of times as the system of compartments has a smaller pitch. However, experience shows that this contact is much less effective in regard to heat transfer than is found to be the case in practice with earlier methods or resistance welding and brazing, in which the bonding zones are much wider than the zone formed with the narrow bridges according to the invention.

The formation of connecting bridges by means of tthe electron bombardment process results, as stated earlier, in the production of a relative vacuum within the compartments formed in the space between the plates. In consequence, the very low pressure which is in fact attained and is at least of the order of $10^{-2}$ torr makes it necessary, especially in the case of sufficiently large dimensions of the compartments formed, to maintain said plates in suitably spaced relation in a system of packing-pieces, which inevitably has the effect of increasing the thermal contacts between said plates. However, a suitable choice of the components of this system can be made with a view to achieving relatively limited total conductivity of the structure while at the same time ensuring effective limitation of creep rates.

Figure 2:
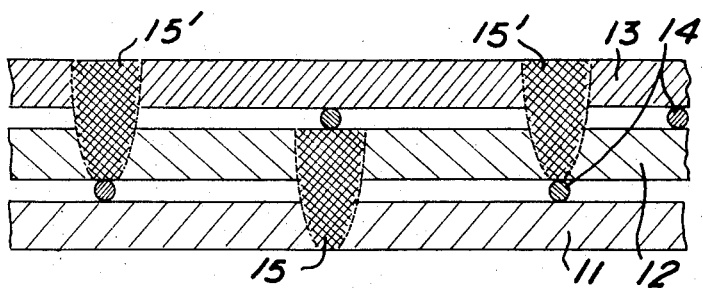
FIG. 2 is a persective view of a heat-insulating structure formed by superposing a plurality of parallel metallic plates bonded together by continuous connecting bridges similar to those illustrated in FIG. 1.

To this end and as illustrated in FIG. 2, the spacing of successive plates such as the plates 11, 12 and 13 is carried out by means of wires 14 which are preferably disposed in a trelliswork arrangement having any size of mesh which is suited to the profile of the compartments formed by the connecting bridges 15. This trellis is advantageously disposed within the space formed between the successive plates of the structure and does not have any overthicknesses at the nodes of the lattice. The wires 14 pass in leak-tight manner through the connecting bridges 15 which serve to fasten the trellis in position with respect to the opposite faces of the plates progressively as said bridges are formed. It is also worthy of note that, by means of the electron beam welding process, satisfactory welds can be obtained even on parts which aare covered with a thin film of insulating material such as oxide or any other metallic compound, the sole condition being that the residual amounts of impurities introduced in the molten zone should remain limited. The trelliswork of wires 14 can therefore be formed by means of metallic elements coated by spraying or any other known method with a thin film of insulating compound such as zirconia which makes it possible to limit the thermal bridge effect resulting from said trelliswork itself without impairing the integrity of leak-tightness of the partition system or with a coating of material having low heat conductivity such as an oxide stable at temperatures of utilization of the structures.

Especially in the case of a heat-insulating structure employed for protecting the wall of a nuclear reactor vessel, the temperature differences to be established between the heat-transporting fluid and the wall also make it necessary to ensure that said structure comprises an extensive series of parallel plates as partially illustrated in FIG. 2, each plate being provided with a compartment lattice having a small pitch and delimited by leak-tight partitions formed by the connecting bridges 15. A further advantage of the method according to the invention arises from the fact that this structure can be formed with as many plates as may be required since it is no longer necessary to have access to both faces of the plates to be joined together as was the case in known methods of the prior art. In the example of FIG. 2, it is thus possible to begin by welding the plate 12 to the plate 11 by means of the connecting bridges 15, then to weld the plate 13 to the plate 12 by means of the bridges 15' and so forth with as many plates as may be found necessary. Furthermore, the method under consideration readily admits of relative displacement of the lines formed by the connecting bridges 15 and 15', for example, thereby preventing said bridges from all being located opposite to each other and setting up a direct leakage path at right angles to the direction of the plates. In the case illustrated in FIG. 2, the leakage path can only be set up through the first bridge 15, through part of the plate 12 and then through the second bridge 15' and so on in sequence from one plate to the other, which considerably increases the total path length which is necessary and limits heat transfer.

Figure 3:
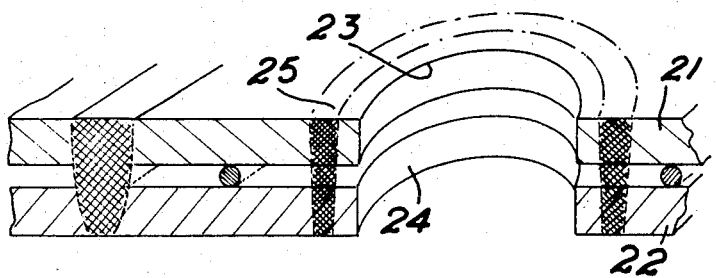
FIG. 3 is a perspective view of an alternative embodiment of the structure according to FIG. 2 and comprising a leak-tight passage for a duct having a circular cross-section.

The invention offers the advantage of solving practically all the problems presented by the interconnection of a plurality of structures or by the penetration of any element through such structures. This is made possible by virtue of the fact that a strictly leak-tight partition system can be formed from the exterior of the structure and without any addition of filler metal within the intermediate space formed between the plates and that a wide range of different shapes is open to selection for the partition-line pattern without involving any difficulty from the point of view of fabrication. In particular, the structure under consideration can readily be traversed by ducts or pipes without thereby disturbing the leak-tight compartment system thus provided. Accordingly, there are shown in FIG. 3 two parallel plates 21 and 22 each pierced by a circular bore designated respectively by the references 23 and 24, said plates being joined together around said bores by a circular and continuous connecting bridge 25 which surrounds externally the machining outline of said bores. It should also be noted that the bridge 25 which in this case delimits the hole provided for the penetration of a pipe through the structure can be formed both before and after machining of the bores 23 and 24 in the plates 21 and 22. In all cases, these arrangements permit maximum reduction of the dead space which is necessary and consequently make it possible to minimize the corresponding heat losses.

Figure 4:
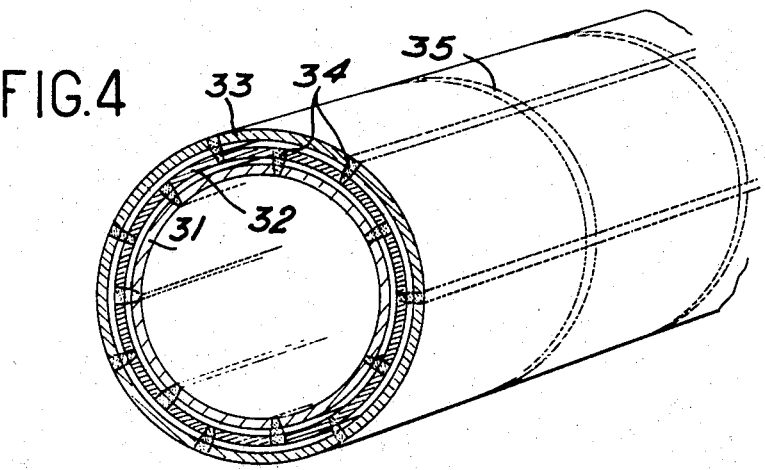
FIG. 4 is a perspective view of another alternative embodiment in which the structure which is formed comprises cylindrical and coaxial plates.

FIG. 4 illustrates another alternative embodiment in which the insulating structure under consideration no longer comprises flat plates in parallel relation but coaxial cylindrical plates such as those designated by the references 31, 32 and 33; these plates are interconnected by bridges 34 extending along generator-lines of the tube which is formed and by bridges 35 oriented in planes at right angles to the axis of said tube. In this alternative embodiment as in the previous embodiment, the bridges 34 and 35 delimit between them adjacent and leak-tight compartments in which a metallic spacing trellis can also be contemplated by reason of the vacuum which is created. It is clearly apparent that other shapes such as a cylindro-spherical shape, for example, could similarly be studied and that the plates employed could be subjected if necessary and prior to assembly to a shaping treatment as carried out by any known method.

No matter what form of construction may be adopted, the heat-insulating structure which is thus provided offers numerous advantages over the structures of the prior art, the main advantages having already been brought out in the foregoing. It is also worthy of note that the known techniques of electron beam welding in an evacuated enclosure having a length which is smaller than that of the elements to be welded are directly applicable to the fabrication of the partition system in accordance with the invention, solely on condition that preliminary insulation of sections of suitable unitary length should be carried out prior to introduction within the welding enclosure proper by means of leak-tight passageways of conventional type. A point finally worth noting is that the maintenance of a primary vacuum within the components formed in the structure largely prevents internal surface corrosion of the elements constituting said structure; these elements can therefore be subjected to a finishing treatment so as to reduce their coefficient of emission, any radiation losses being thus reduced to a considerable extent.

As can readily be understood and as has already become apparent from the foregoing, the invention is not limited in any sense to the exemplified embodiments hereinbefore described with reference to the drawings but extends to all alternative forms.

What we claim is:

1. A heat-insulating structure comprising a stack of spaced substantially parallel plates having a small relative spacing, connecting bridges formed by electron beam welding of said plates joining said plates in pairs, said bridges defining closed compartments under vacuum between said plates, the vacuum required for the welding operations being maintained within said compartments at least one spacing system mounted between each pair of said plates, said spacing system being a wire mesh trellis, said trellis being attached to said plates at the intersection of said wires.

2. A structure according to claim 1, wherein the wires of the spacing system are provided with a coating of material having low heat conductivity such as an oxide which is stable at the temperatures of utilization of the structure.

3. A structure according to claim 1, wherein said compartments between said plates provide free passageways for elements such as pipes passing through the structure without thereby impairing the leak-tightness of said compartments.

4. A structure according to claim 1, wherein said connecting bridges of said compartments between a given plate and the preceding plate in the structure are relatively displaced with respect to said connecting bridges of the compartments between said given plate and the following plate.

* * * * *